United States Patent [19]

MacLeod

[11] Patent Number: 5,027,523
[45] Date of Patent: Jul. 2, 1991

[54] LEARNING DEVICE FOR AIDING A PERSON IN FORMING ALPHANUMERIC COMBINATIONS

[76] Inventor: Steven R. MacLeod, 147 W. Gates, Romeo, Mich. 48085

[21] Appl. No.: 537,345

[22] Filed: Jun. 13, 1990

[51] Int. Cl.$^5$ ............................................. G09B 11/04
[52] U.S. Cl. ........................................ 33/564; 434/164; 434/163; 434/171; 33/566
[58] Field of Search .................. 33/562, 564, 565, 566, 33/563; 434/162, 163, 164, 167, 171, 172

[56] References Cited

U.S. PATENT DOCUMENTS

| | | |
|---|---|---|
| 148,291 | 3/1974 | Fowler . |
| 1,205,386 | 11/1916 | Perényi . |
| 1,425,597 | 8/1922 | Boric . |
| 1,541,480 | 6/1925 | Compton et al. . |
| 3,633,286 | 1/1972 | Maurer . |
| 3,731,402 | 5/1973 | Paul ................................ 434/164 |
| 3,740,872 | 6/1973 | Mayo ............................... 434/164 |
| 3,861,066 | 1/1975 | Klaja . |
| 4,470,197 | 9/1984 | Pagalies . |
| 4,505,044 | 3/1985 | Shaffi-Rad-G. . |
| 4,563,154 | 1/1986 | Vandervort et al. . |

*Primary Examiner*—Harry N. Haroian
*Attorney, Agent, or Firm*—Basile and Hanlon

[57] ABSTRACT

A learning device for aiding a person in forming alphanumeric combinations comprises a base having a top and a bottom. A template has an insert receiving aperture formed therein. The template is removably attached to the base, and a stencil insert having a figure formed therein is removably receivable within the insert receiving aperture. Also disclosed is a method for using the present learning device.

5 Claims, 2 Drawing Sheets

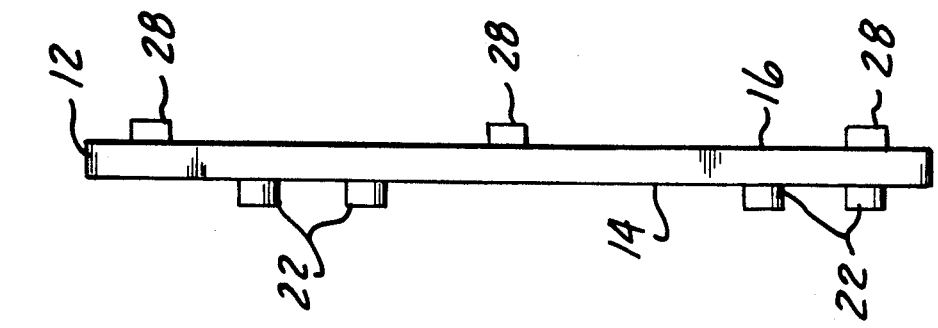
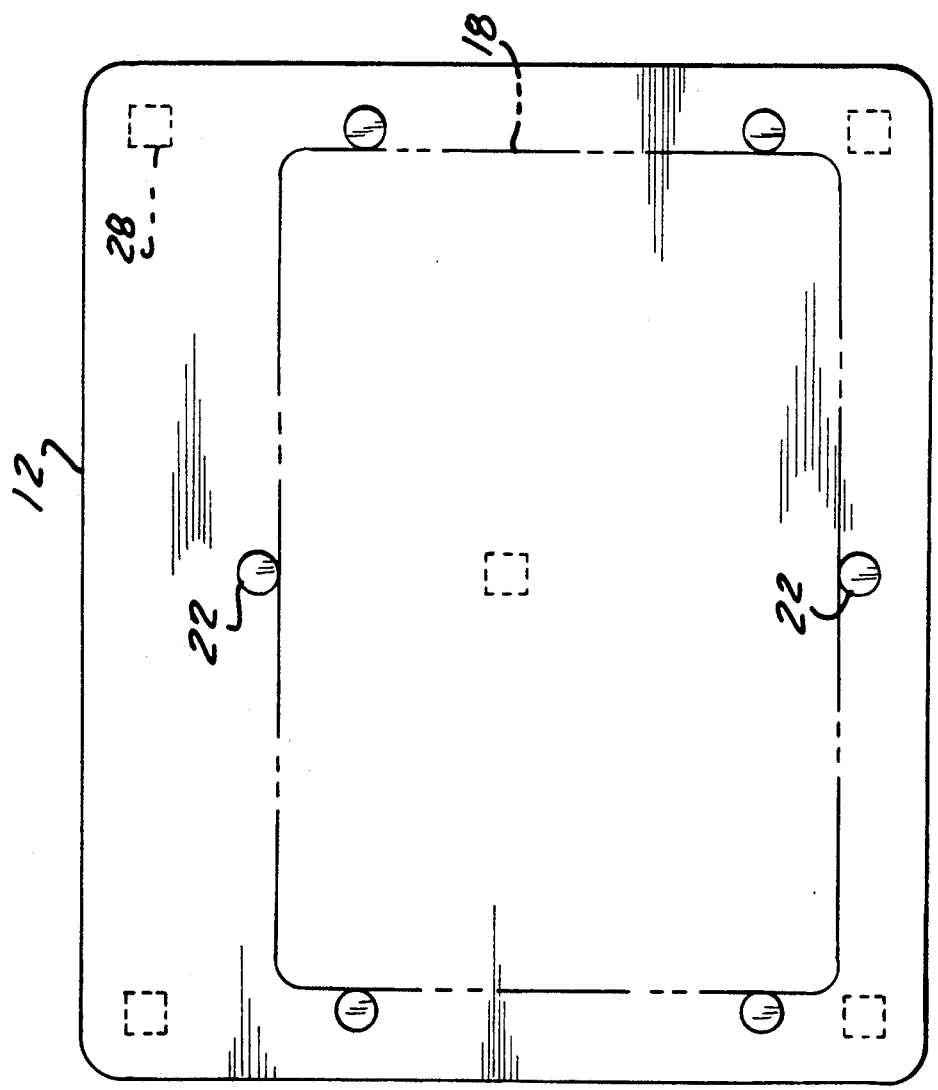

LEARNING DEVICE FOR AIDING A PERSON IN FORMING ALPHANUMERIC COMBINATIONS

BACKGROUND OF THE INVENTION

1. Field of the Invention

This invention relates generally to learning devices, and more particularly to those devices which aid a person in forming alphanumeric combinations.

2. Description of the Relevant Art

It has long been known that single layer, single piece templates can be useful in lettering, making curved lines, or forming various geometric shapes. Previous drawing aids have been designed such that one particular template is only used for one particular purpose. This would force a person to purchase many different templates to perform various tasks. This can be expensive, time consuming and tedious.

Another drawback of lettering guides in particular is that they are not especially useful in teaching people, especially young children, to spell. A lettering guide would simply contain the twenty-six letters of the alphabet in upper and/or lower case, without a student being able to rearrange the letters in any specific order.

Thus, it would be desirable to provide a template which can serve as a learning guide. It would also be desirable to provide such a template with various removable stencil inserts such that the template can be used to form any alphanumeric combinations or any other desired shape or figure.

SUMMARY OF THE INVENTION

The present invention addresses and solves the limitations discussed above, by providing a learning device for aiding a person in forming alphanumeric combinations. The learning device comprises a base having a top and a bottom, and a template having an insert receiving aperture formed therein. Means are provided for removably attaching the template to the base. A stencil insert having a figure formed therein is removably receivable within the insert receiving aperture.

BRIEF DESCRIPTION OF THE DRAWINGS

Other objects and features of the invention will become apparent by reference to the following specification and to the drawings, in which:

FIG. 2 is a top view of the base of the present invention;

FIG. 3 is a side view of the base;

DESCRIPTION OF THE PREFERRED EMBODIMENT

Figure 1:
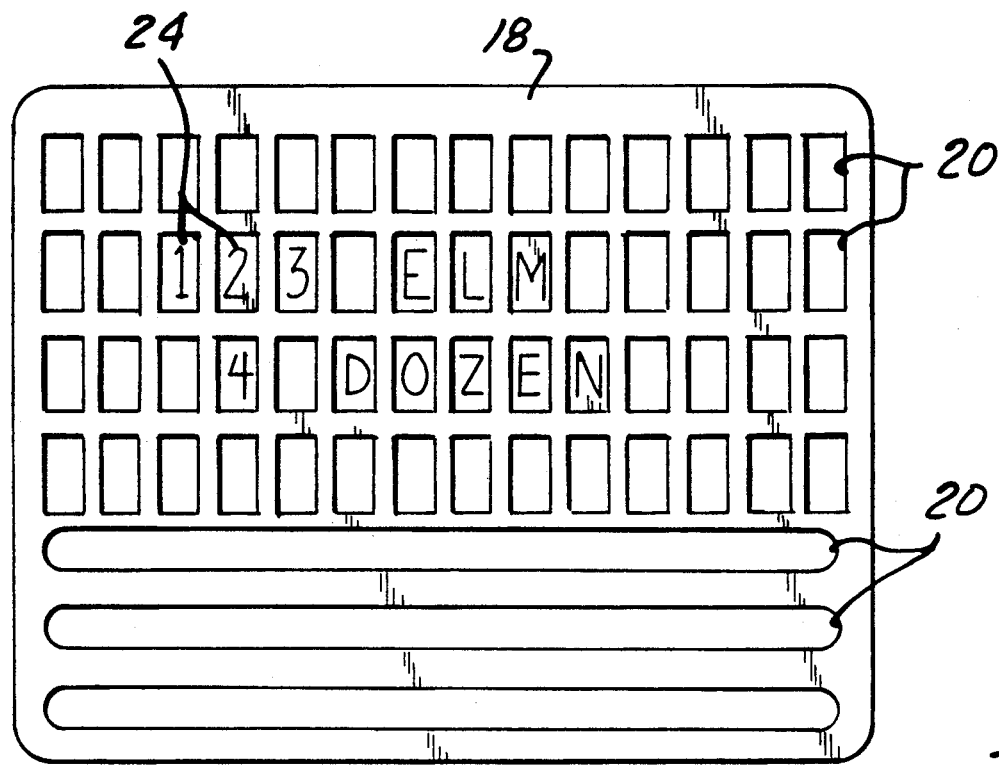
FIG. 1 is a top view of the template of the present invention.
Figures 4, 5:
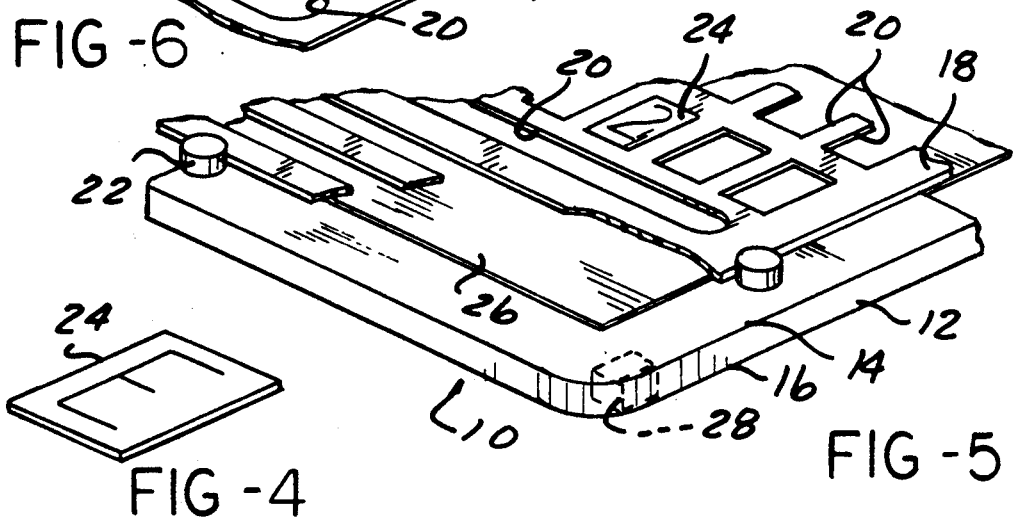
FIG. 4 is an enlarged perspective view of a stencil insert of one embodiment of the present invention.
FIG. 5 is an enlarged cutaway perspective view of one embodiment of the present invention after assembly and ready for use.

Referring now to FIG. 5, there is shown a learning device for aiding a person in forming alphanumeric combinations, designated generally as 10. Learning device 10 comprises a base 12 having a top 14 and a bottom 16. Learning device 10 further comprises a template 18, having an insert receiving aperture 20 formed therein. As shown in FIG. 1, template 18 may contain a plurality of insert receiving apertures 20. Apertures 20 may also be in any geometric shape or form. They may be in the form of rectangles, with each rectangle adapted to hold one insert, or they may be in the form of longitudinal slots, thereby adapted to hold several inserts, or one long insert.

Means are provided for removably attaching template 18 to base 12. This attaching means may comprise any suitable means, but in the preferred embodiment, it comprises a plurality of projections 22 as seen in FIGS. 2 and 5. These projections 22 extend outwardly from the top 14 of base 12. Projections 22 are spaced apart from each other to define an opening therebetween which closely and stationarily receives the template 18 when template 18 is placed over base 12.

Referring now to FIGS. 4 and 5, device 10 further comprises a stencil insert 24 having a figure formed therein. This figure may be an alphanumeric figure, a geometric shape, or any other desired figure. Insert 24 is removably receivable within insert receiving aperture 20. The stencil inserts may be removably received within the insert receiving apertures 20 by any suitable means. In the preferred embodiment, inserts 24 are dimensioned such that they may be snap fitted into insert receiving apertures 20. Depending upon the shape of insert receiving apertures 20, which may be of any desired shape or size, inserts 24 will correspondingly be of any suitable shape or size. Thus, inserts 24 may be easily snapped into template 18 and just as easily removed, thereby allowing a person to spell out or form an infinite number of alphanumeric combinations.

Learning device 10 further comprises paper 26 and means for securing paper 26 between base 12 and template 18. If paper 26 is cut to be the same size as template 18, projections 22 will keep paper 26 stationary, thereby securing paper 26 between base 12 and template 18 when template is in overlying relationship thereto. The securing means may further comprise any suitable means, including adhesive tape and the like.

Projections 28 may optionally be included on bottom 16 of base 12. These projections 28 can be formed to any length to order to lift learning device 10 a predetermined distance from the desk or table top at which the user sits.

Figures 6, 7:
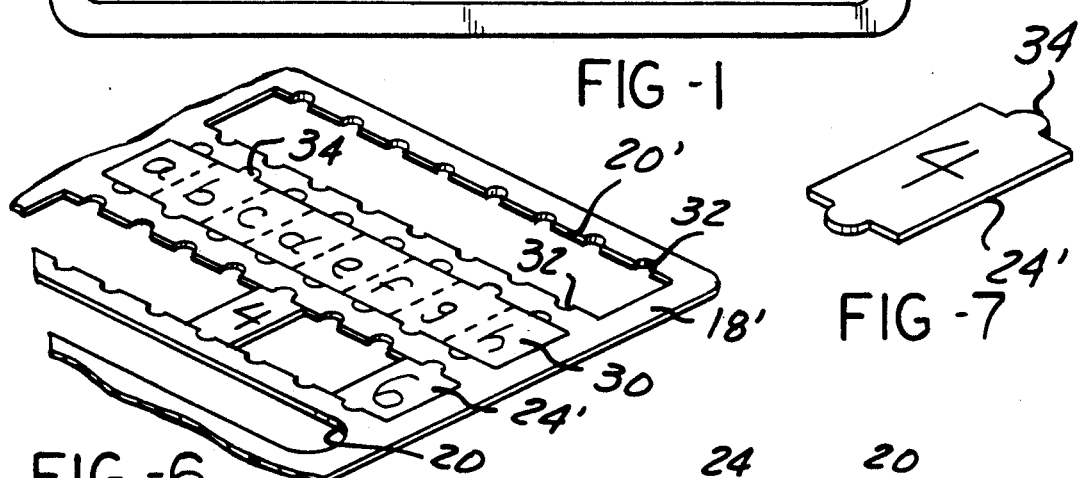
FIG. 6 is a cutaway perspective view of the template of a second embodiment of the present invention.
FIG. 7 is an enlarged perspective view of a stencil insert of a second embodiment of the present invention.

A second embodiment of the present invention is shown in FIGS. 6 and 7. Template 18' contains a plurality of insert receiving apertures 20' which have a plurality of projection receiving grooves 32 along the top and bottom of aperture 20'. These grooves 32 correspond to suitably placed projections 34 on the top and bottom edges of an insert 24' or 30'. Insert 24' is a single insert with one figure formed therein. Insert 30 is one long insert with many figures formed therein. When inserts 24' or 30 are snapped fit into template 18', grooves 32 hold projections 34 secure, thereby minimizing any chance of unwanted movement of the inserts when in use. The inserts 24' or 30 may have any desired number of projections 34, but in the second preferred embodiment, one projection 34 is on the top and bottom edge of insert 24', and two projections 34 are on each of the top and bottom edges of insert 30, as shown in FIG. 6.

A method for learning to form alphanumeric combinations comprises the following. The user would first releasably attach a piece of paper 26 to a top surface 14 of a base 12 having a plurality of projections 22 extending outwardly therefrom, with projections 22 spaced to closely surround a template 18. The user would then removably and stationarily attach template 18 to base 12 by placing template 18 within an opening formed between projections 22, thereby securing paper 26 between base 12 and template 18.

The user would then removably snap fit a plurality of stencil inserts 24 having letter or numeral figures formed therein, within a plurality of insert receiving apertures 20 formed in template 18, such that stencil inserts 24 form a predetermined alphanumeric combination.

The person would then trace the insert figures onto paper 26, thereby writing the alphanumeric combination. The final steps would comprise lifting template 18 off from base 12 and removing paper 26 from base 12. It is to be understood that a similar method could be utilized for the second disclosed embodiment.

Learning device 10 is extremely useful in helping people, especially children, learn to spell and form letters or other figures correctly. Since the template 18 does not have any predetermined lettering, the student can spell any word out himself by choosing the correct stencil insert letter and snapping it into place in the template in the correct configuration. Thus, with one learning device 10 and a plurality of inserts 24, the student can form an almost infinite number of alphanumeric combinations.

While certain embodiments of the present invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A learning device for aiding a person in forming alphanumeric combinations, the learning device comprising:
   a base having a top and a bottom;
   a template having an insert receiving aperture formed therein;
   a plurality of projections extending outwardly from the top of the base, the projections being spaced apart from each other to define an opening therebetween which closely and stationarily receives the template when the template is placed over the base; and
   a stencil insert having a figure formed therein, the insert removably receivable within the insert receiving aperture.

2. A learning device for aiding a person in forming alphanumeric combinations and writing the combinations on paper, the learning device comprising:
   a base having a top and a bottom;
   a template having an insert receiving aperture formed therein;
   means for removably attaching the template to the base;
   a stencil insert having a figure formed therein, the insert removably receivable within the insert receiving aperture; and
   means for securing the paper between the base and the template, the paper securing means comprising the attaching means.

3. The learning device as defined in claim 2, further comprising a plurality of insert receiving apertures and a plurality of removable inserts.

4. A learning device for aiding a person in forming alphanumeric combinations and writing the combinations on paper, the learning device comprising:
   a base having a top and a bottom;
   a template having a plurality of insert receiving apertures formed therein;
   a plurality of projections extending outwardly from the top of the base, the projections being spaced apart from each other to define an opening therebetween which closely and stationarily receives the template when the template is placed over the base, the paper being receivable between the base and the template, and kept stationary by the projections and the template when the template is placed over the base; and
   a plurality of stencil inserts each having a figure formed therein, the inserts removably receivable within the insert receiving apertures.

5. A method for learning to form alphanumeric combinations, the method comprising:
   releasably attaching a piece of paper to a top surface of a base having a plurality of projections extending outwardly therefrom, the projections spaced to closely surround a template;
   removably and stationarily attaching the template to the base by placing the template within an opening formed between the projections, thereby securing the paper between the base and the template;
   removably snap fitting a plurality of stencil inserts each having a figure formed therein, within a plurality of insert receiving apertures formed in the template, such that the stencil inserts form a predetermined alphanumeric combination;
   tracing the insert figures onto the paper, thereby writing the alphanumeric combination; lifting off the template from the base; and removing the paper from the base.

* * * * *